United States Patent [19]

Frankland, Jr.

[11] 4,255,379
[45] Mar. 10, 1981

[54] INJECTION MOLDING USING SCREW FOR PROCESSING HEAT SENSITIVE POLYMERIC MATERIALS

[75] Inventor: James D. Frankland, Jr., New Castle, Pa.

[73] Assignee: New Castle Industries, Inc., New Castle, Pa.

[21] Appl. No.: 913,972

[22] Filed: May 30, 1978

Related U.S. Application Data

[62] Division of Ser. No. 797,828, May 17, 1977, abandoned.

[51] Int. Cl.³ .................................................. B29F 1/02
[52] U.S. Cl. ................................ 264/328.17; 264/537; 366/89; 425/208
[58] Field of Search .................. 264/329, 328, 328.1, 264/328.8, 328.17, 537; 425/207, 208, 209; 366/88, 89

[56] References Cited

U.S. PATENT DOCUMENTS

| | | | |
|---|---|---|---|
| 2,990,579 | 7/1961 | Hendry | 264/329 |
| 3,560,605 | 2/1971 | Siggel et al. | 264/328 |
| 3,664,795 | 5/1972 | Heinz et al. | 425/208 |
| 3,737,151 | 6/1973 | Schaeffer | 259/191 |
| 3,868,093 | 2/1975 | Sokolow | 366/88 |
| 3,954,366 | 5/1976 | Fields | 425/208 |

*Primary Examiner*—Jeffery R. Thurlow
*Attorney, Agent, or Firm*—Robert D. Yeager

[57] ABSTRACT

An injection molding screw for use in processing heat sensitive polymeric materials and a process for plasticating such materials. The screw has an inlet end, a discharge end, means for mounting a backflow valve on the discharge end, and at least one section which applies high shear and high compression to the polymeric material and controls the material flow rate. A flighted screw section is disposed between the high shear and high compression section and the discharge end; that screw section includes means for decompressing the polymeric material and pumping it to the discharge end of the screw in the decompressed state at a rate at least equal to the pumping rate of the zone of high shear and high compression.

7 Claims, 9 Drawing Figures

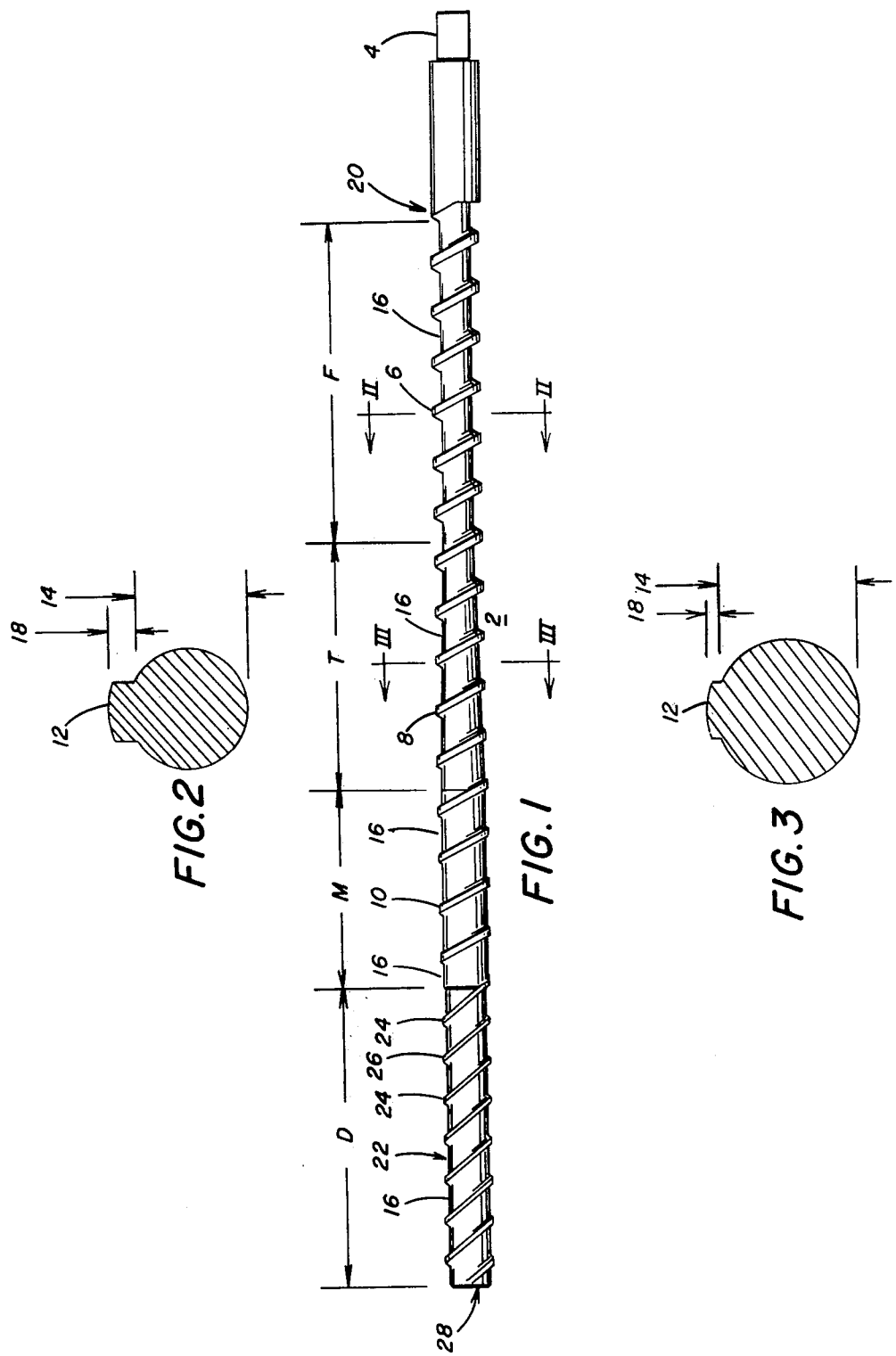

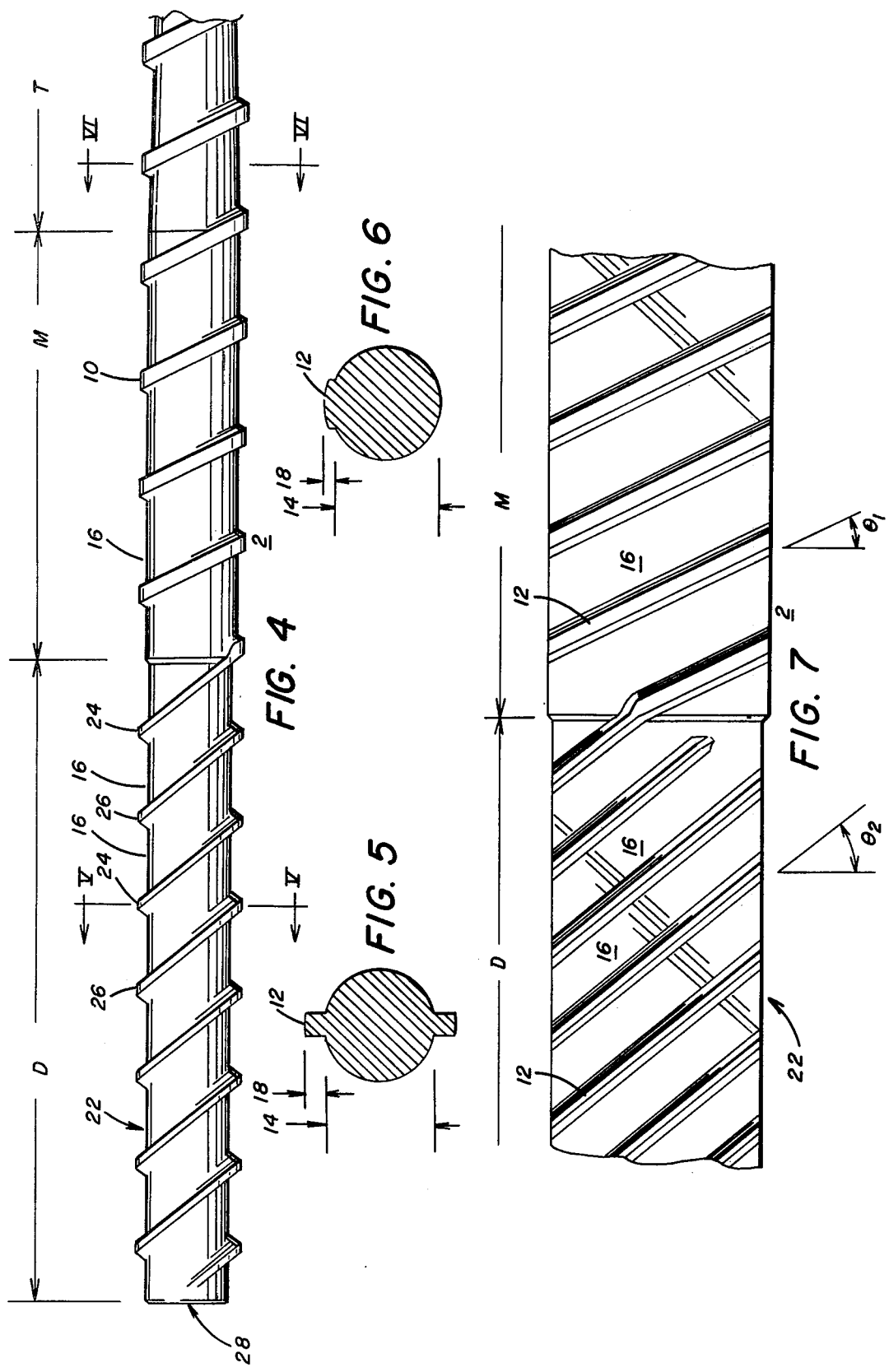

INJECTION MOLDING USING SCREW FOR PROCESSING HEAT SENSITIVE POLYMERIC MATERIALS

This is a division of application Ser. No. 797,828 filed May 17, 1977 now abandoned.

BACKGROUND OF THE INVENTION

1. Field of the Invention

This invention relates to injection molding screws and more particularly to injection molding screws for use in processing heat sensitive polymeric materials. The invention also relates to an improved process for plasticating such materials in an injection molding machine.

2. Description of the Prior Art

The injection molding process involves feeding a particulate thermoplastic polymer into the hopper of an injection molding machine and thence through a zone where the polymer is plasticated into a melt which is then forced into a mold that conforms the polymer to a desired shape.

The injection molding process is extensively used in producing thermoplastic articles of a wide variety of shapes and sizes. The success of injection molding is attributable to several aspects of the process, the most important being the achievement of high production speeds and minimal waste. The production speeds are maximized by the continuous aspects of the process while material waste is minimized by an ability to reprocess waste thermoplastic polymer.

In addition to the inherent advantages of the injection molding process itself, the types of articles susceptible of fabrication by injection molding have continually expanded through the development of thermoplastic polymers having particularly desirable properties for specific applications and the discovery of techniques for processing such polymers in injection molding apparatus. The result has been the availability of a wide range of injection molded products having desirable chemical and physical properties specified by consumers of such products.

Thus, while any thermoplastic polymer may be processed in injection molding apparatus, the ability to achieve a useful end product depends upon the chemical and physical properties of the polymer and how these properties are affected by the process conditions within the injection molding apparatus. In accordance with the need to adjust processing parameters in the injection molding operation, four main types of systems have been developed to melt and inject the thermoplastic polymer. These systems are referred to as (1) reciprocating screw, (2) single stage plunger, (3) two-stage plunger and (4) fixed screw ram. Combinations of these systems have also been used.

The most widely used system is the reciprocating screw. In this system, a supply of the particulate thermoplastic polymer is maintained in a hopper which feeds the inlet end of a plasticating screw encased in a constant diameter barrel. Typically, the screw has three separate sections: (1) a feed section, (2) a transition section, and (3) a metering section. The hopper transfers (usually by gravity) particulate thermoplastic polymer to the feed section of the screw which has a constant root and a single helical flight of constant pitch. The distance from the land of the screw flight to the root (i.e. the channel depth) is sufficient to permit conveyance of the particulate polymer along the helical channel, while also providing for the application of shearing force to the polymer. The mechanical energy imparted to the polymer through the application of shear is converted to thermal energy and thereby the temperature of the polymer begins to rise. The screw conveys the polymer to the transition section where the root constantly increases in diameter with a resultant intensification of the shear and compression forces to which the polymer is subjected. In the transition section, the polymer begins to melt and be mixed, the objective being the eventual formation of a homogeneous, melted mass of polymeric material. From the transition section, the polymer proceeds to the metering section where compression and average shear are at their maximum levels and where the mass flow rate of polymer along the plasticating screw is regulated.

From the metering section, the polymeric melt is deposited in front of the discharge end of the screw. A backflow valve, which is mounted on the discharge end of the screw, prevents the reverse movement of material onto the screw. As the material is so deposited, the screw retracts until a predetermined space beyond the discharge end of the screw is filled with the polymer melt. When the desired amount of polymer accumulates in that space, the screw becomes a plunger, is moved forward, and forces the polymer melt into a mold or molds of specific shape. The melt is allowed to cool within the mold before the pressure is released. After cooling, the article thus formed is ejected from the mold and the process is repeated.

Although the three section screw is by far the most popular for use in the injection molding process, other screw designs have been used. For example, an injection molding screw may have more than one metering section. But common to all injection molding screws is the progressive average increase of root diameter from the inlet end to the discharge end with the feed section of the screw being characterized by low average shear and low compression and the discharge end being characterized by high average shear and high compression. When used herein, the term "high shear" means the maximum average mechanical force applied to the polymeric material when the material is subjected to high compression; and the term "high compression" means the maximum pressure to which the polymeric material is subjected during the plastication process.

Although conventional injection molding screws are satisfactory for the processing of many polymers, heat sensitive polymers present unique problems and have caused workers in the art to seek alternate screw designs. As used herein "heat sensitive polymers" means those thermoplastic polymers having threshold decomposition temperatures close to, or in the range of, the temperatures necessary for plastication. The difficulty in processing heat sensitive polymers with conventional injection molding screws centers around the inability of such screws to provide the necessary homogeneity in the final polymer melt without exceeding the time/temperature limits for preventing thermal decomposition of the polymer. Examples of such heat sensitive polymers are the chloro- and fluoro-hydrocarbon polymers and the polyesters.

In applications, for example, where the injection molded article is used to contain food, beverages or the like, even minute amounts of a polymer's thermal decomposition products may adversely affect taste; and because the polyesters, particularly polyethyleneterephthalate, are useful in this application, the thermal decomposition products thereof, specifically acetaldehyde, must be eliminated by proper processing to prevent imparting undesirable taste to the food or beverage.

Thus, in accordance with the present invention, an injection molding screw is provided which substantially eliminates thermal polymeric decomposition of heat sensitive polymers in the injection molding process. Further, the present invention provides a process for plasticating such polymers in an injection molding machine while avoiding thermal polymeric decomposition.

SUMMARY OF THE INVENTION

An injection molding screw is provided for use in processing heat sensitive polymeric materials. The screw has an inlet end, a discharge end, a means for mounting a backflow valve on the discharge end, and a section for applying high shear and high compression to the polymeric material while controlling the pumping rate of material flow therefrom. A flighted screw section is disposed between the high shear and high compression section and the discharge end. This screw section has means for decompressing the polymeric material and pumping it to the discharge end of the screw.

Further, the present invention provides an improved process for plasticating a heat sensitive polymeric material in an injection molding machine. Typically, such a process includes the steps of feeding heat sensitive polymeric material in particulate form to the inlet end of a plasticating screw, conveying the heat sensitive polymeric material along the screw from a zone of low shear and low compression progressively to a zone of high shear and high compression, metering the flow of the polymeric material from the zone of high shear and high compression, discharging the polymeric material from the plasticating screw, and preventing the backflow of polymeric material onto the screw. The improvement of the present invention comprises: decompressing the polymeric material following the metering step but before the discharge step while pumping the polymeric material along the plasticating screw at a rate at least equal to the pumping rate of said zone of high shear and high compression.

Other advantages of the present invention will become apparent from a consideration of the following detailed description taken with the accompanying drawings.

BRIEF DESCRIPTION OF THE DRAWINGS

In the drawings, wherein like reference numerals denote corresponding parts in the several views:

FIG. 1 is a side elevation of an injection molding screw embodying the present invention;

FIG. 2 is an enlarged sectional view taken along line II—II of FIG. 1;

FIG. 3 is an enlarged sectional view taken along line III—III of FIG. 1;

FIG. 4 is an enlarged elevation of the metering and decompression zones of the screw shown in FIG. 1;

FIG. 5 is an enlarged sectional view taken along line V—V of FIG. 4;

FIG. 6 is an enlarged sectional view taken along line VI—VI of FIG. 4;

FIG. 7 is a development of portions of the metering and decompression zones shown in FIG. 4;

DESCRIPTION OF THE PREFERRED EMBODIMENT

Figure 8:
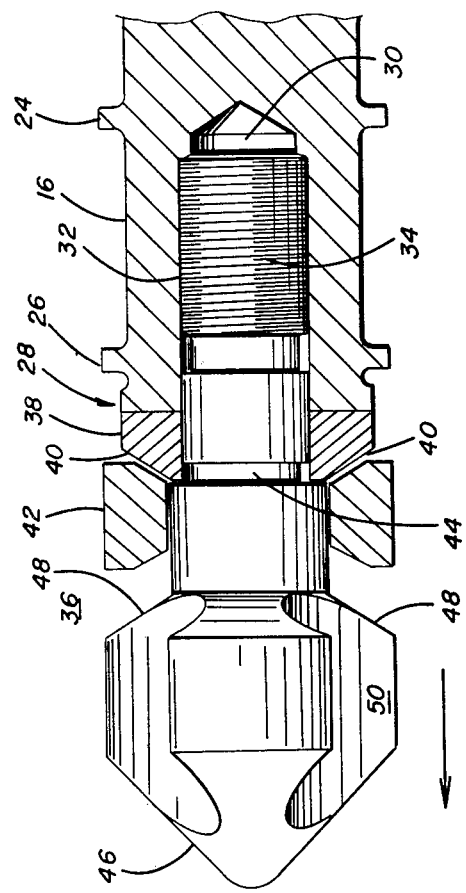
FIG. 8 is an enlarged side elevation, partly in section, of the left end of the injection molding screw of FIGS. 1 and 4, schematically illustrating the mounting of a backflow valve to the screw.

Referring to the drawings, the reference numeral 2 indicates generally a complete injection molding screw adapted for use in an injection molding machine in which the screw reciprocates. Screw 2 is adapted for rotation within a barrel (not shown) whose structure and function is well known in the art. Shaft 4, extending from the right end of screw 2, is dimensioned to fit within a chuck (not shown) which is connected to a rotation means (not shown) for rotating screw 2 at the desired rate.

Screw 2 includes, from right to left, three sections typical of injection molding screws: a feed section designated by the letter "F"; a transition section designated by the letter "T"; and a metering section designated by the letter "M". These three sections have helical flight sets 6, 8 and 10, respectively. Flights 6, 8 and 10 are illustrated as being set at a constant helix angle (denominated $\theta_1$ in FIG. 7) throughout sections F, T and M, although it is understood that this angle may vary from section to section or even within a single section. Flights 6, 8 and 10 are provided with peripheral surface portions (lands) 12 which are portions of revolution of a constant diameter right circular cylinder. Lands 12 are shown to be of constant width throughout sections F, T and M although this dimension may be varied as desired.

In order to better understood the present invention which is embodied in the section of the screw marked "D", it will be helpful to further describe the nature and function of conventional sections F, T and M of screw 2. In section F, the feed section, screw 2 has a constant diameter root 14 throughout the section. The helically extending channel 16, formed by the walls of flight section 6 and the exterior surface of root 14, has a depth 18 which, as described hereinafter, is relatively deep compared with the channel depths present in sections T and M. As is well known, the channel depth present in the feed section F is needed to accept the solid polymeric material, in pellets or like particulate form, which is fed onto screw 2 at its inlet end 20 from a hopper (not shown).

The polymeric material is forcibly conveyed along channel 16 toward transition section T. As the material moves in channel 16, it is subjected to compression and shear; some of the material may be forced over lands 12 of flight 6 and thereby be subjected to extremely high shear forces. The imparting of mechanical energy to the polymeric material in this manner, together with the optional application of external heat from the barrel, causes the temperature of the material to rise.

In the transition section T, the diameter of the screw root 14 is progressively increased in the direction of material flow (indicated by the arrow in FIG. 1), with a corresponding progressive decrease in the depth 18 of channel 16. A comparison between the root diameter 14 and channel depth 18 in the feed section F with those dimensions in the transition section T is shown in FIGS. 2 and 3. The steady reduction of the depth 18 of channel 16 in the transition section causes an increase in the compression and shear forces to which the polymeric material is subjected. The temperature of the material continues to increase to the point where the material flows and begins to plasticate.

The polymeric material is conveyed along the transition section T until it reaches the metering section M. The progressive increase in the root diameter 14 of screw 2 that obtained in the transition section ceases at the metering section and the root diameter 14 in the metering section is constant. The depth 18 of channel 16 is at its smallest value in the metering section M. The pressure and average shear applied to the polymeric material within the metering section are at their maximum values compared with any previous location along screw 2. By the time the polymeric material completes its transit along the metering section, the material is substantially all melted.

As alluded to earlier, the final metering section in a conventional injection molding screw would mark the end of the screw. The pumping action of the metering section in such a screw would serve to regulate the flow of melted polymer into an accumulation zone located downstream of the end of the screw. As the volume of polymer would accumulate to a predetermined value, the rotating screw would move backwardly, opposite the direction of material flow. When the required volume of melted polymer deposited ahead of the screw would be reached, the screw would be thrust forward to force the polymer into a mold or molds of desired shape.

The objective of the plastication operation in any injection molding operation is to provide in the accumulation zone a homogeneous mass of melted polymer at a desired uniform temperature. With conventional injection molding screws, typified by the foregoing description, all of the mixing of the polymer and most of the heat application must be accomplished by intensively subjecting the polymer to the mechanical action of shear and compression within the three sections provided in such screws, especially within the transition and metering sections. Generally, this means that the residence time of the polymer in these latter sections must necessarily be extended. Experience has shown that heat sensitive polymers thermally degrade under such conditions and product decomposition products which can adversely affect the properties of the final molded article.

Turning then to the present invention, the drawings and particularly FIGS. 1 and 4, illustrate a member, generally designated by the numeral 22, extending from the metering section M. For reasons that will be further developed, member 22 comprises a decompression section which has been designated by the letter "D". Member 22 includes at least one but preferably two or more identical, parallel flight sets 24 and 26 disposed at a helix angle denominated $\theta_2$ in FIG. 7. It will be noted that the helix angle $\theta_2$ of flights 24 and 26 is substantially greater than the helix angle $\theta_1$ of flight 10 in the metering section. In orders of magnitude, $\theta_1$ is approximately 17° and $\theta_2$ is approximately 27° in the embodiment shown in the drawings. As will be appreciated by those skilled in the art, $\theta_1$ and $\theta_2$ may vary within their theoretical limits for screw design depending upon well known variables. The present invention, however, will be characterized by $\theta_2$ being substantially greater than $\theta_1$. The significance of this change in "lead" will be discussed below.

Member 22 also includes means for decompressing the polymeric material flowing onto it from the metering section M. The decompression means illustrated in the drawings takes the form of increased available volume within channels 16 compared with the available volume of channel 16 in the metering section. This volume increase in the decompression section D is brought about, notwithstanding the presence of two flight sets instead of one, by a deepening of channels 16 through a reduction in the root diameter 14 and a narrowing of the average width of flights 24 and 26 (the latter being best seen in FIGS. 5 and 6). This change in available volume causes a depressurization of the polymeric melt as it flows from the metering section M into the decompression section D.

As described above, the helix angle of flight sets 24 and 26 is substantially increased in the decompression section D so that member 22 serves as a means for pumping the decompressed polymer melt to the discharge end 28 of screw 2 at a rate at least equal to, and preferably greater than, the pumping rate of the metering section. Thus the screw section of member 22 has both a substantially increased helix angle and an increased channel depth compared to the metering section. The magnitude of these interdependent increases may be varied by those skilled in the art provided that the polymer is decompressed by member 22 and the pumping rate of the polymer along member 22 is at least equal to the pumping rate of the metering section. In the embodiment of the present invention shown in the drawings, the helix angle increase between the metering section and the decompression section is 10° with a concomitant increase of 0.028 diameters in the channel depth. With this embodiment, the pumping rate of the decompression section exceeds the pumping rate of the metering section.

The combination of providing decompression and conveying makes member 22 uniquely useful in the processing of heat sensitive polymers. Decompression of the polymer results in a marked decrease in the shear rates to which the polymer is subjected; this reduction in shear means that the conversion of mechanical energy to thermal energy in the polymer, with a resultant temperature increase, is controlled. Decompression also serves to redistribute the flow of the polymeric material to provide a low shear mixing effect. The increase in flight lead permits the flighted section of member 22 to rapidly convey the polymer along channels 16 to the discharge end 28 of the screw 2. Consequently, the beneficial decompression is accomplished at little or no increase in polymer residence time because the pumping rate of the decompression section is at least equal to the pumping rate of the metering section.

As a secondary benefit of the increased helix angle (and resultant relatively high material flow rate) in the decompression stage, the metering section is able to discharge into a low pressure region brought about by that high flow. Accordingly, the shear rates in the feed, transition and metering sections are reduced because of the increased material output per revolution of the screw and the virtual elimination of a negative pressure flow effect.

The double flights 24 and 26 in the decompression section of the present invention improve the thermal transfer characteristics of that section. By reason of the flight lands 12 wiping the barrel twice per revolution of the screw 2, the rate of removal of cooled polymer film from the inside surface of the barrel increases and therefore the achievement of temperature uniformity within the polymer mass is accelerated. More than two flight sets can be successfully employed in the decompression section but optimum results are achieved with double flights. Further, the width of flights 24 and 26 are designed to be as narrow as possible, consistent with considerations of structural rigidity, to minimize the shear rate between the flight lands 12 and the inner surface of the barrel. This latter feature has a pronounced effect on the cooling efficiency of the decompression section in that many prior art injection screw designs tend to add more heat to the polymer due to shear over the flight lands than can be removed by conduction to a cooled barrel.

An example of a preferred embodiment of the present invention is a reciprocating injection molding screw having an L/D of 20:1 wherein the decompression section occupies about one-third of the total flighted length. The feed, transition and metering sections have a single helical flight with the flight lead being constant throughout and generally equal to the screw (outside) diameter. The width of this single flight is 0.10 diameters. The feed section has a constant root diameter, a length of seven diameters, and a constant channel depth throughout of 0.18 diameters. The transition section has a tapered root section, a length of 4.8 diameters, and a progressively decreasing channel depth from 0.18 diameters to 0.06 diameters. The metering section has a constant root diameter, a length of 4 diameters, and a constant channel depth of 0.06 diameters.

In the decompression section D, the flight lead increases to 1.6 diameters, and a second flight is introduced at the same lead to create a double flight of about 0.8 diameters pitch. The channel depth is increased to 0.088 diameters and remains constant throughout the section. The thickness of the flights is reduced to 0.125 inches and this dimension is maintained throughout the flights in the decompression section.

Figure 9:
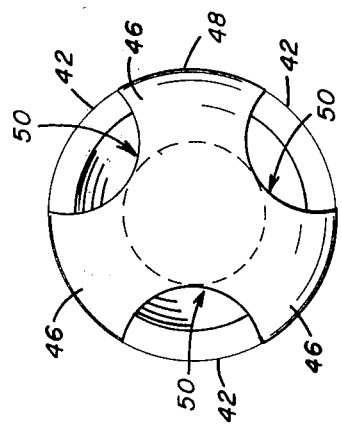
FIG. 9 is a left end view of the backflow valve of FIG. 8 with parts removed for clarity.

The screw exemplified by the foregoing is adapted for mounting to its discharge end 28 a backflow valve of any suitable type. One such backflow valve is schematically illustrated in FIGS. 8 and 9. FIG. 8 shows the discharge end 28 of screw 2 having a central bore 30 which is provided with female threads 32 to receive the male threaded end 34 of a backflow valve generally designated by the numeral 36. Valve 36 includes a fixed ring 38 in abutting relationship with the end of screw 2 and providing a beveled seat 40 for movable valve member 42 which is loosely fitted over the main body member 44 of backflow valve 36. Valve head 46, which is rigidly connected to main body member 44, provides a second beveled seat 48 for movable valve member 42. Valve head member contains three circumferentially-spaced, longitudinally-extending recesses 50 to permit the free flow of melted polymer in the direction indicated by the arrow on FIG. 8.

In operation, melted polymer is conveyed along channels 16 of decompression section D and flows through the annulus (not shown) formed by the loose fitting movable valve member 42 and main body member 44. In this condition, movable valve member 42 is shifted to its left position where it is seated against valve head 48. The polymeric material thus flowing is forced through recesses 50 and deposited into an accumulation zone (not shown). As the polymer accumulates, a back pressure is developed to the point where movable valve member 42 moves to the right to the position shown in FIG. 8 and seats against fixed ring 38. This action blocks any return flow of polymer into channels 16 of the decompression section.

The process of the present invention may be illustrated by the following example: Pellets of polyethyleneterephthalate having an intrinsic viscosity in the range of 0.6 to 1.5 at 25° C. in orthochlorophenol are fed by gravity from a hopper to the feed section of a plasticating screw rotating within the barrel of an injection molding machine. The polymeric material is conveyed along the screw from a zone of low average shear and low compression progressively to a zone of high shear and high compression. At the time the polymeric material reaches the end of the latter zone, it is in a plasticated state and contains sufficient heat energy to impart the desired fluidity (flux) to the mass. Temperature differentials may exist, however, within the plasticated mass.

The flow of plasticated polymer is metered from the aforementioned zone of high shear and high compression into a zone along the plasticating screw which operates to decompress the polymer while continuing to convey it toward the discharge end of the screw. The pumping rate of the decompression zone is greater than the pumping rate of the zone of high shear and high compression. In the decompression zone, the polymer is mixed under conditions of low shear and cooled to a uniform temperature. The polymer is then discharged from the decompression zone of the plasticating screw through a valve which prevents the backflow of polymer onto the plasticating screw. Polymer is accumulated ahead of the screw until a desired volume is obtained. The plasticating screw is thrust forward against the accumulated polymer and forces it into a series of molds adapted to form test-tube shaped preforms. When the preforms are sufficiently cooled, the mold is opened and the preforms are ejected.

The preforms are further processed in a well-known blow molding machine to form 64 oz. containers of clear impact-resistant polyethyleneterephthalate. The containers thus formed are filled with a carbonated cola beverage capped and allowed to stand for an appropriate period. The containers are opened and the contents are subjected to human taste-testing. The amount of acetaldehyde present in the containers is at a sufficiently low level as to have no perceivable adverse effect on the cola beverage as ascertained from the taste test.

What is claimed is:

1. In the process of plasticating polyethyleneterephthalate in an injection molding machine which process includes the steps of feeding particulate polyethyleneterephthalate to the inlet zone of a plasticating screw, conveying said polyethyleneterephthalate along said screw from a zone of low average shear and low compression to a zone of high shear and high compression, metering the flow of said polyethyleneterephthalate from said zone of high shear and high compression, discharging said polyethyleneterephthalate from said plasticating screw, the improvement comprising:
   reducing the amount of acetaldehyde produced from the decomposition of said polyethyleneterephthalate by decompressing said polyethyleneterephthalate following said metering step but before said discharge step while pumping said polyethyleneterephthalate along said screw at a rate at least equal to the pumping rate of said polyethyleneterephthalate in said zone of high shear and high compression.

2. The method of claim 1 together with the step of preventing backflow of said discharged polyethyleneterephthalate onto said screw.

3. The method of claim 1 wherein said decompressing of the polyethyleneterephthalate is effected by increasing the volume along the screw in a zone.

4. The method of claim 1 wherein said decompressing of the polyethyleneterephthalate is effected by increasing the volume along the screw in a zone, and the pumping rate is maintained by increasing the helix angle and number of flights of the screw in the zone of increased volume.

5. The method of claim 1 wherein said decompressing of the polyethyleneterephthalate is effected by increasing the volume along the screw in a zone, said increase in volume being at least in part effected by a reduction in flight width.

6. The method of claim 1 wherein said decompressing of the polyethyleneterephthalate is effected by increasing the volume along the screw in a zone while maintaining the screw flight diameter.

7. The method of claim 1 wherein the polyethyleneterephthalate is substantially all melted when the metering is completed.

* * * * *